June 14, 1966  L. N. WILLIAMS  3,256,132
VINYL RESIN SEALING STRIP
Filed March 4, 1963
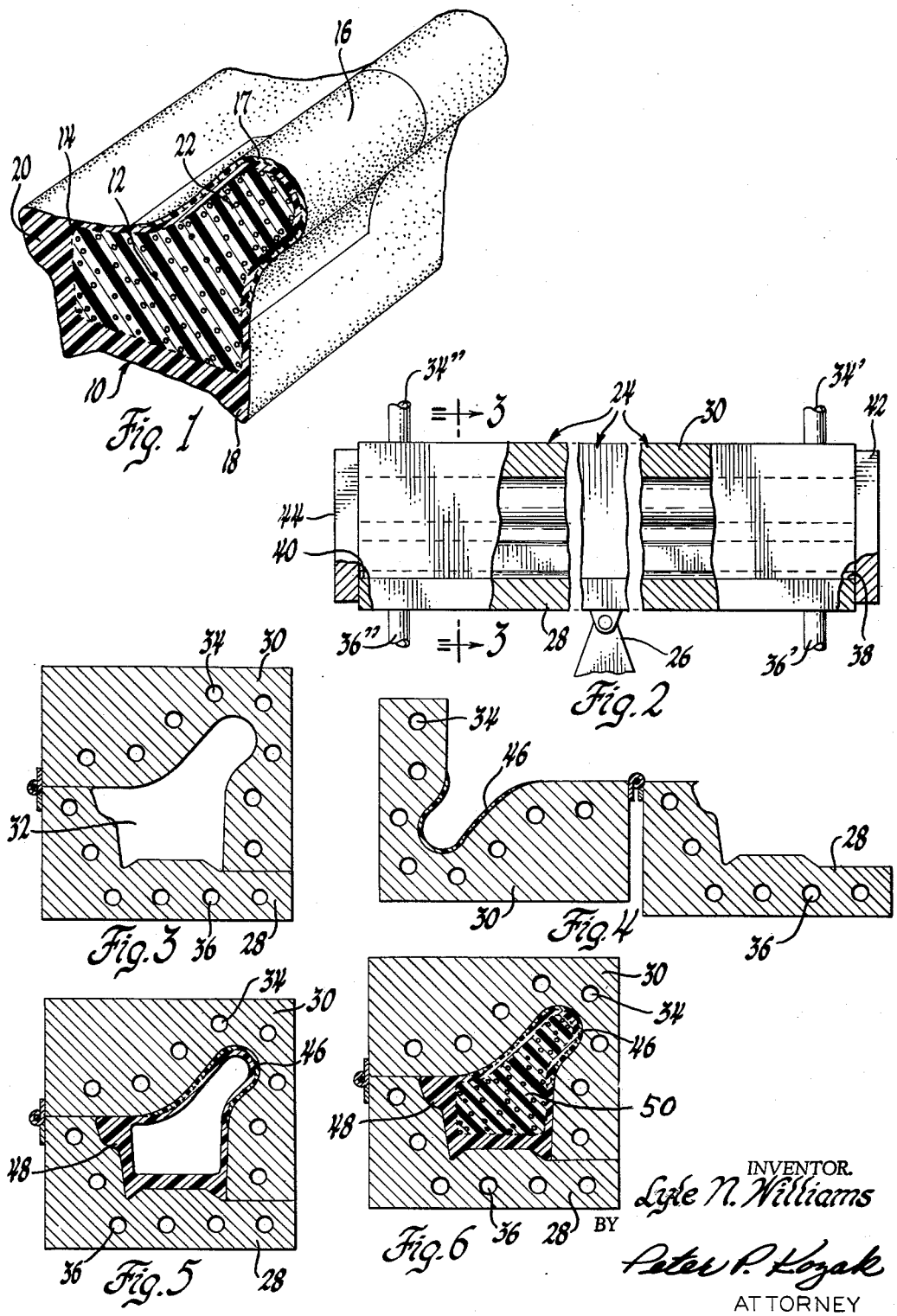
INVENTOR.
Lyle N. Williams
BY
Peter P. Kozak
ATTORNEY

United States Patent Office 3,256,132
Patented June 14, 1966

3,256,132
VINYL RESIN SEALING STRIP
Lyle N. Williams, Anderson, Ind., assignor to General Motors Corporation, Detroit, Mich., a corporation of Delaware
Filed Mar. 4, 1963, Ser. No. 262,464
4 Claims. (Cl. 161—160)

This invention relates to vinyl resin articles such as polyvinyl chloride resin foam weatherstrips or the like and more particularly to a vinyl resin article having selected surface portions thereof modified by another synthetic resin whereby the said selected portion is provided with superior wear resistance.

Related subject matter is disclosed in the United States patent applications Serial No. 17,518, filed March 25, 1960, now Patent No. 3,170,967, and Serial No. 99,581, filed March 30, 1961, assigned to the assignee of the present invention.

It is the customary practice in the past to manufacture automobile weatherstrips and the like from natural and synthetic resin latices including natural rubber, butadiene acrylonitrile copolymers and other synthetic rubbers. Weatherstrips manufactured of these materials are typically coated with a solid rubbery material to make the strip substantially impervious to moisture penetration. Since these coatings are relatively thin, it has been customary to apply patches of nylon cloth and similar wear-resistant materials to areas of the strip which in use are subjected to relatively hard wear. As described in the above-mentioned patent applications, vinyl resin foam strips have also been developed which are suitable for sealing strip use. The surface skin layer provided on these vinyl strips is likewise relatively thin in the interest of flexibility and economy and accordingly it also has been necessary to adhesively apply reinforcing layers or patches of nylon cloth or the like to portions thereof which are subjected to excessive wear. The procedure of applying the patches referred to is both expensive and time consuming. Moreover, since the patch material typically has a different texture and color than the base strip material, an undesirable appearance is created.

It is the basic object of this invention to provide a wear-resistant vinyl foam sealing strip comprising a vinyl resin foam core terminating in a solid polyvinyl resin outer skin layer which includes an integrally formed non-porous abrasive-resistant modified polyvinyl resin surface in at least a selected area thereof which in use is subjected to inordinate wear. A further object of this invention is to provide a process for making the aforementioned sealing strip.

In general, these and other objects are accomplished by a process including the steps of first applying a vinyl plastisol layer to a selected area of a heated mold which comprises a mixture of a vinyl resin plastisol and an acrylic monomer, then permitting the mixture to gel on the mold surface, then applying a second layer consisting of a vinyl plastisol resin over said first selected layer and also over the entire mold surface, then applying a mass of a foamable vinyl plastisol over said second layer and finally heating the superimposed layers for a time sufficient to foam the third layer and fuse all said layers into an integral mass.

Other objects and advantages of the invention will be apparent from the following description thereof, reference being made to the accompanying drawings, in which:

FIGURE 1 is a perspective view of a fragment of a sealing strip made in accordance with the invention;

FIGURE 2 is an elongated mold;

FIGURE 3 is a cross-sectional view taken along line 3—3 of FIGURE 2;

FIGURES 4, 5 and 6 are cross-sectional views similar to that of FIGURE 3 illustrating the process of this invention at various stages.

As previously stated, this invention is concerned primarily with the manufacture of a sealing strip, preferably of the type employed in connection with the sealing of automobile doors, which consists of a vinyl resin foam core and a moisture-impervious solid vinyl resin outer surface integrally formed therewith. As shown in FIGURE 1, the sealing strip 10 includes a foam core portion 12 and an outer non-porous skin portion 14 integrally formed with the core 12 and further includes a selected section 16 in which the outermost surface portion thereof is modified by preferably an acrylic resin to provide it with exceptional wear resistance. Preferably, the sealing strip is provided with a relatively thick base portion 18 by which the strip may be fastened to a support member such as a car body and a relatively thick side section 20 for providing the sealing strip with the desired degree of rigidity on the side thereof opposite the sealing lip portion 22. In the areas of the sealing strip which are to be subjected to excessive wear, the surface thereof is provided with a modified layer or portion 17 in accordance with this invention.

The sealing strip of this invention may be made by the process described below. An elongated two-part mold 24 is provided which is preferably pivotally mounted on a support 26. The mold 24 may consist of a lower half 28 and an upper half 30 as shown in FIGURE 3 which define between them a mold cavity 32. It will be observed that the lower half 28 defines the lower portions of the sealing strip including the relatively heavy base portion 18 and the side portion 20. The upper mold half 30 defines the sealing lip portion 22. Although the sealing strips may be formed in any length, it has been found convenient to form them in lengths of about 14 feet and to build the mold 24 about 14 feet long. The upper mold half 30 is provided with longitudinal oil passages 34, an inlet opening 34' and an outlet opening 34''. The lower mold half 28 is likewise provided with longitudinal passages 36 including an inlet opening 36' and an outlet opening 36'' through which a heated fluid such as an oil may be passed to apply heat to these mold sections independently. Of course, any suitable means such as electrical heating elements and induction heating may be employed to heat the mold sections. The mold 24 terminates at each end thereof in the openings 38 and 40. Closure plates 42 and 44 respectively secured by clamps (not shown) are provided for closing the openings 38 and 40. Because of the pivotal mounting of the mold, the openings 38 and 40 may be caused to serve as downward or upward directed openings depending on the plane at which the mold 24 is permitted to rest.

In practicing the invention the mold 24 is preferably initially supported in a horizontal position and opened as shown in FIGURE 4. Hot oil is then pumped through the conduit 34 of the upper mold section 30. When the mold half 30 reaches a temperature of about 155° F. as measured by a thermocouple associated with this portion of the mold, a layer of a vinyl plastisol 46 modified for wear resistance, preferably a vinyl plastisol admixed with an acrylic resin monomer, is applied to the areas of the mold as shown in FIGURE 4 which will form the portions of the sealing strip to be subjected to unusually hard wear. A suitable vinyl plastisol for this purpose is as follows.

| | Parts by weight |
|---|---|
| Polyvinyl chloride resin | 100 |
| Dioctyl adipate plasticizer | 35 |
| Monomeric epoxidized oil plasticizer | 35 |
| Dibasic lead phosphite stabilizer | 2 |
| Triethylene glycol dimethacrylate | 20 |
| Tertiary butyl perbenzoate catalyst | 0.2 |

The composition of this modified vinyl plastisol may vary considerably in that other polyvinyl resin materials such as polyvinyl chloride-acetate copolymers and vinyl chloride-diethyl maleate copolymers may be used in place of the polyvinyl chloride. Various plasticizers such as tricresyl phosphate, di-2-ethylhexyl phthalate, dioctyl adipate, dioctyl sebacate and mixtures of these and other suitable plasticizers may be used. The proportions of plasticizer may vary between 60 and 100 parts by weight. The stabilizer may vary from about 1 to 5 parts by weight. The acrylic monomer may vary from about 15 to 25 parts by weight per 100 parts of the vinyl resin. Other polymerizable acrylic monomers such as ethylene glycol dimethacrylate, tetraethylene glycol dimethacrylate and polyethylene glycol dimethacrylate may be used in place of the triethyene glycol dimethacrylate.

The modified plastisol may be applied to the mold surface by spraying or brushing or by the slush molding technique in which the upper mold portion 30 of FIGURE 4 is filled with the modified plastisol substantially to the level indicated by the presence of the layer 46 in FIGURE 4 for a time sufficient to cause a layer of suitable thickness to gel on the mold surface. After a layer of suitable thickness is formed, the residual ungelled modified plastisol is poured off by tilting the mold to an inclined position. Cool oil is then circulated through the conduits 34 of the upper portion of the mold until the temperature thereof reaches about 125° F.

Next, the mold is closed and tilted so that the one opening 38 is raised to a higher position than the opening 40. Hot oil is then pumped through the conduits 36 in the lower half of the mold until the temperature of the lower half of the mold reaches about 170° F. as measured by a thermocouple associated therewith. Meanwhile, the cavity 32 is completely filled with an unmodified vinyl plastisol through the opening 40 and the closure plates 44 and 42 are applied to the ends of the mold. Filling the mold from its lower end insures that the mold cavity is completely filled. When the upper mold half 30 has again reached a temperature of about 155° F. due to the heat imparted to the lower part of the mold, additional heat is applied to the upper half 30 of the mold by pumping hot oil through the conduits 34. The heating is continued until the upper mold portion 30 reaches a temperature of about 170° F. Circulation of the hot oil in both mold halves is then stopped and cool oil is circulated therethrough until the upper mold half attains a temperature of about 125° F. During these heating steps a layer 48 of the vinyl plastisol is formed adjacent the mold surface and over the modified plastisol layer 46 as shown in FIGURE 5. Since the modified plastisol layer 46 is in merely a gelled state, the unmodified plastisol layer 48 will blend therewith to form a continuous phase. Since the lower half 28 has been heated for a longer period of time and to a higher temperature than the upper half 30, the unmodified vinyl resin buildup adjacent the lower mold half surfaces is proportionally greater. This differential heating step permits the relatively thick base portion 18 and side portion 20 to be formed. Preferably the heating is continued for a time sufficient to cause a layer adjacent the lower portion of the mold to be about 0.06 inch in thickness whereas the vinyl plastisol layer adjacent the upper portion of the mold is about 0.005 inch in thickness. In the area occupied by the modified plastisol 46, the plastisol layer is about 0.0075 inch thick.

By the term "vinyl plastisol" as used herein is meant a dispersion of a vinyl resin such as a polyvinyl chloride resin in a plasticizer together with stabilizers and the like. At elevated temperatures in the vicinity of 300° F. the polyvinyl chloride resin will dissolve into the plasticizer and fuse into a flexible thermoplastic resin. A suitable vinyl plastisol formulation for use in forming the nonporous unmodified portion 48 of the weatherstrip surface is as follows:

| | Parts by weight |
|---|---|
| Polyvinyl chloride resin | 100 |
| Dioctyl adipate plasticizer | 35 |
| Monomeric epoxidized oil plasticizer | 35 |
| Dibasic lead phosphite stabilizer | 2 |

The composition of this vinyl plastisol may vary in that other polvyinl resin materials such as polyvinyl chloride-acetate copolymers and vinyl chloride-diethyl maleate copoymers may be used in place of the polyvinyl chloride. Various plasticizers such as tricresyl phosphate, di-2-ethylhexyl phthalate, dioctyl adipate, dioctyl sebacate and mixtures of these and other suitable plasticizers may be used. The proportion of plasticizer may vary between 60 and 100 parts by weight. The stabilizer may vary from about 1 to 5 parts by weight. The particular vinyl plastisol to be used in the formation of the skin layer 48 is not critical except insofar as a vinyl plastisol of suitable viscosity is necessary to cause the plastisol to readily flow in and out of the mold cavity as is required in the process.

After the gelled vinyl plastisol layer 48 of desired thickness has been formed, the closure plate 42 is removed and a vacuum (not shown) is applied to the opening 38 for the purpose of rapidly and efficiently removing the ungelled vinyl plastisol material from the mold cavity. Next, the mold is tilted so that the opening 38 is in a lower position than the end 40. At this time, the temperature of the mold is about 125° F. A metered quantity of a foamable or expandable vinyl plastisol is next injected into the lowered opening 38. The quantity of expandable plastisol foam injected into the mold cavity and over the gelled layer 48 is sufficient to fully occupy the mold cavity space after it has expanded.

By the term "expandable vinyl plastisol" as used herein is meant a dispersion of a vinyl resin such as a finely divided polyvinyl chloride resin in a plasticizer into which has been incorporated a blowing agent such as N,N'-dinitroso-N,N'-dimethyl terephthalamide. A specific example of a suitable expandable vinyl plastisol is 100 parts of a plastisol-grade polyvinyl chloride, 100 parts tricresyl phosphate, 5 parts dibasic lead phosphite and 3 parts N,N'-dinitroso-N,N'-dimethyl terephthalamide. As in the case of the nonexpandable vinyl plastisol described above, other polyvinyl resins may be employed such as the polyvinyl chloride-acetate copolymers and vinyl chloride-diethyl maleate copoylmers. Similarly, other plasticizers such as tricresyl phosphate and di-2-ethylhexyl phthalate may be used. Stabilizers such as dibasic lead phosphite and the epoxy resin stabilizer Ferro 900, manufactured by the Ferro Corporation, may be used. Based on 100 parts by weight of polyvinyl chloride resin, 80 to 105 parts of a suitable plasticizer may be used and 3 to 5 parts of a stabilizer may be included in the plastisol. 1 to 8 parts, preferably 2 to 4 parts, of N,N'-dinitroso-N,N'-dimethyl terephthalamide blowing agent is incorporated in the vinyl plastisol.

After the metered quantity of the expandable vinyl plastisol has been injected into the mold cavity, the mold is heated to about 225° F. for the purpose of causing the blowing agent to decompose and release a gas capable of blowing or expanding the vinyl plastisol into a uniform cellular structure. The heating at the decomposition temperature of the blowing agent is continued until the foamed material comes out of the raised opposite end 40 of the mold. This insures that the vinyl plastisol has expanded to a suitable degree and has completely filled the mold cavity bteween the walls of the gelled vinyl plastisol layer 48 with the foamed mass 50. The N,N'-dinitroso-N,N'-dimethyl terephthalamide blowing agent decomposes at about 175° F. and accordingly it is only necessary to heat the foamable plastisol to this temperature to cause a blowing or expansion of the vinyl plastisol material. However, it is found that best results are obtained by heating the mold to about 225° F. Blowing temperatures ranging from 180° F. to 250° F. produce satisfactory results.

The mold portions 28 and 30 are then heated to a temperature in the vicinity of 330° F. Meanwhile, the foamed plastisol material has had an opportunity to contact and fuse with the gelled solid plastisol layer 48. As the mold members 28 and 30 are heated to 330° F., the vinyl plastisol foam core 50 as well as the solid layers 48 and 46 fuse and form a self-sustaining polyvinyl chloride resin material. The layer 48 and foam mass 50 fuse together coextensively to form a continuous phase of the vinyl resin. Similarly, the modified layer 46 and unmodified layer 48 fuse to form a continuous phase. However, the acrylic portion of the modified layer 46 polymerizes to form a cross-linked thermoset polymer to provide this portion of the weatherstrip with a relatively tough, abrasion-resistant surface. Typically, a satisfactory fusion of the vinyl plastisol foam 50 and the solid skin layers 46 and 48 is accomplished in about two minutes. The mold is then cooled and the sealing strip is removed and cooled to room temperature. Thereafter, the sealing strip may be heat treated as described in the aforementioned patent application Serial No. 17,518 to provide the strip with resistance to setting.

The vinyl plastisol sealing strip formed in accordance with the method set forth above provides a tough, abrasion and water-resistant outer layer which is formed integrally with the foamed main body. Fusing the vinyl plastisol materials at the lower temperatures of about 330° F. rather than the more conventional vinyl plastisol fusion temperatures of about 350° F. has the additional beneficial effect of forming a relatively fine and uniform cellular structure particularly desirable in sealing strip material for use in connection with automobile doors.

While the embodiment of the present invention as herein described constitutes a preferred form, it is to be understood that other forms may be adopted within the spirit of the invention.

I claim:

1. A flexible elongated synthetic resin sealing strip including a sealing lip portion, said strip having an integral cross-sectional structure comprising a polyvinyl resin foam core portion terminating at its outer periphery in a solid moisture-impervious vinyl resin layer formed integrally therewith, at least a portion of said layer of said sealing lip portion in an area which in use of said strip is subjected to excessive localized wear including in the outermost surface portion of said layer substantial proportions of an acrylic resin to thereby impart superior wear resistance to said area.

2. The sealing strip of claim 1 in which said acrylic resin is present in amounts by weight of about 15 to 25 parts of acrylic resin per 100 parts of the polyvinyl resin.

3. A flexible elongated synthetic resin sealing strip including a sealing lip portion, said strip having an integral cross-sectional structure comprising a polyvinyl resin foam core portion and an integrally formed moisture-impervious vinyl resin layer extending about the periphery of said core portion and a solid moisture-impervious material located at least on said sealing lip portion of the sealing strip which in use is normally subjected to excessive localized wear and formed integrally with said vinyl resin layer and comprising a vinyl resin including proportions of an acrylic resin.

4. The sealing strip of claim 3 in which said material includes about 15 to 25 parts by weight of an acrylic resin per 100 parts of the vinyl resin.

References Cited by the Examiner

UNITED STATES PATENTS

| | | | |
|---|---|---|---|
| 1,904,910 | 4/1933 | Wideman et al. | 20—69 |
| 2,122,608 | 7/1938 | Harlow | 20—69 |
| 2,327,580 | 8/1943 | Carney | 20—69 |
| 2,618,621 | 11/1952 | Burt | 260—884 X |
| 2,753,599 | 7/1956 | Pietraszek et al. | 264—45 |
| 2,893,063 | 7/1959 | Hoppe | 264—45 |
| 2,995,534 | 8/1961 | Adams et al. | 260—884 X |
| 3,041,682 | 7/1962 | Alderfer et al. | 20—69 |
| 3,127,640 | 4/1964 | Streetman | 20—69 |
| 3,153,265 | 10/1964 | Hosea et al. | 20—69 |
| 3,154,600 | 10/1964 | Munn | 260—884 |

HARRISON R. MOSELEY, *Primary Examiner.*

W. E. HEATON, *Assistant Examiner.*